(12) United States Patent
Liu et al.

(10) Patent No.: US 9,996,988 B2
(45) Date of Patent: Jun. 12, 2018

(54) INTELLIGENT TIRE PRESSURE MONITORING SYSTEM AND METHOD

(71) Applicant: LAUNCH TECH CO., LTD., Shenzhen (CN)

(72) Inventors: Jun Liu, Shenzhen (CN); Qichao Chen, Shenzhen (CN)

(73) Assignee: LAUNCH TECH CO., LTD., Shenzhen (CN)

( * ) Notice: Subject to any disclaimer, the term of this patent is extended or adjusted under 35 U.S.C. 154(b) by 0 days. days.

(21) Appl. No.: 15/023,636

(22) PCT Filed: Jan. 15, 2015

(86) PCT No.: PCT/CN2015/070785
§ 371 (c)(1),
(2) Date: Mar. 21, 2016

(87) PCT Pub. No.: WO2016/019707
PCT Pub. Date: Feb. 11, 2016

(65) Prior Publication Data
US 2017/0200326 A1    Jul. 13, 2017

(30) Foreign Application Priority Data

Aug. 7, 2014  (CN) .......................... 2014 1 0387960

(51) Int. Cl.
*G07C 5/00* (2006.01)
*B60C 23/04* (2006.01)
*G01M 17/02* (2006.01)

(52) U.S. Cl.
CPC .......... *G07C 5/008* (2013.01); *B60C 23/0403* (2013.01); *B60C 23/0479* (2013.01);
(Continued)

(58) Field of Classification Search
CPC combination set(s) only.
See application file for complete search history.

(56) References Cited

U.S. PATENT DOCUMENTS 5,343,741 A * 9/1994 Nishihara ............. B60C 23/061
340/444
6,430,993 B1 * 8/2002 Seta .......................... B60C 3/00
73/146

(Continued)

FOREIGN PATENT DOCUMENTS

CN      2039271 U     6/1989
CN      1872573 A     12/2006
(Continued)

*Primary Examiner* — Adam D Tissot
*Assistant Examiner* — Edward J Pipala
(74) *Attorney, Agent, or Firm* — Shimokaji IP

(57) ABSTRACT

An intelligent tire pressure monitoring system and method are provided in present disclosure. The system includes a CAN bus module, a diagnosing module, a processor, a 3G module, a GPS module and a server. The CAN bus module and the diagnosing module detect rotational speed of each tire and steering angle of steering wheel, and send a detecting result data the processor. The GPS module obtains position information of the automobile, and sends it to the processor. The processor calculates and processes the detecting result data and the position information of the automobile, and uploads them to the server through the 3G module. The server calculates a pressuring value of each tire according to the detecting result data, the position information of the automobile, weather conditions of continuous several days, and condition of road traveled by the automobile, and do appropriate treatment.

8 Claims, 2 Drawing Sheets

(52) U.S. Cl.
CPC ...... *B60C 23/0484* (2013.01); *B60C 23/0488* (2013.01); *B60C 23/0489* (2013.01); *G01M 17/02* (2013.01)

(56) References Cited

U.S. PATENT DOCUMENTS

| | | | | |
|---|---|---|---|---|
| 6,498,967 | B1* | 12/2002 | Hopkins | B60C 23/0408 340/442 |
| 8,321,086 | B2* | 11/2012 | Park | G07C 5/085 701/34.3 |
| 2010/0198491 | A1* | 8/2010 | Mays | B60W 30/09 701/124 |
| 2012/0053792 | A1* | 3/2012 | Xiao | B60T 8/1755 701/41 |

FOREIGN PATENT DOCUMENTS

| | | |
|---|---|---|
| CN | 201096879 Y | 8/2008 |
| CN | 101590791 A | 12/2009 |
| CN | 102303490 A | 1/2012 |
| CN | 102514454 A | 6/2012 |
| CN | 102529603 A | 7/2012 |
| CN | 202623813 U | 12/2012 |
| CN | 202656973 U | 1/2013 |
| CN | 202782528 U | 3/2013 |
| CN | 104118284 A | 10/2014 |
| EP | 0796748 A1 | 9/1997 |
| JP | 10297228 A | 11/1998 |
| KR | 20130018354 A | 2/2013 |

* cited by examiner

INTELLIGENT TIRE PRESSURE MONITORING SYSTEM AND METHOD

CROSS-REFERENCE TO RELATED APPLICATIONS

This application claims the benefit of priority to Chinese Patent Application No. 201410387960.8 field in the Chinese Patent Office on Aug. 7, 2014 and entitle "INTELLIGENT TIRE PRESSURE MONITORING SYSTEM AND METHOD", the content of which is hereby incorporated by reference herein in its entirety.

FIELD OF THE INVENTION

The present disclosure relates to a field of automobile tire pressure monitoring technology, and more specifically, to an intelligent tire pressure monitoring system and method.

BACKGROUND OF THE INVENTION

If tire pressure of an automobile is too high, when the automobile travels, a contact area between the tire and the ground is reduced, the tire pressure of the tire increases, grip of the tire is affected. When the automobile passes ditch or bumpy road, there is not enough space inside the tire to absorb shock, not only stability and comfort of the automobile is affected when the automobile travels, but also impact strength to suspended system is increased, thus harm brought. It can be seen that a suitable tire pressure not only helps driving comfort, but also guarantees driving safely.

Advanced sensor technology is used in tire pressure monitoring system (TPMS). When the automobile moves, the TPMS directly measures tire pressure and tire temperature by using a pressure sensor d a temperature sensor, and transmits the tire pressure and the tire temperature to a cab console via wireless modem. A driver can intuitively know conditions of the tire pressure and the tire temperature of each tire. The TPMS can automatically alarm when the tire is flat, low pressure and high temperature, thus a traffic safety is ensured. However, the cost of TPMS is high, and the TPMS is trouble in installation, and installation time is longer.

SUMMARY OF THE INVENTION

The purpose of present disclosure is providing an intelligent tire pressure monitoring system and method which are easy to install and low cost.

The purpose of present disclosure is realized by the following technology solution.

An intelligent tire pressure monitoring system includes a controller area network bus module, a diagnosing module, a processor, a $3^{rd}$ generation module, a global positioning system module and a server.

The controller area network bus module and the diagnosing module are configured to detect rotational speed of each tire of the automobile and steering angle of steering wheel of the automobile, and send the rotational speed of each tire of the automobile and steering angle of steering wheel of the automobile to the processor, wherein the rotational speed of each tire of the automobile and steering angle of steering wheel of the automobile are regarded as detecting result data.

The global positioning system module is configured to obtain position information of the automobile, and send the position information of the automobile to the processor.

The processor is configured to calculate and process the detecting result data and the position information of the automobile, and upload the detecting result data and the position information of the automobile which are calculated and processed to the server through the 3rd generation module;

The server is configured to calculate a pressuring value of each tire of the automobile according to the detecting result data, the position information of the automobile, weather conditions of continuous several days, and condition of road traveled by the automobile, and do appropriate treatment according to the pressuring value of each tire of the automobile Further, the server is configured to transmit the pressuring value of each tire of the automobile to the processor through the $3^{rd}$ generation module, and the pressuring value of each tire is displayed by a vehicular display device to inform a driver.

Further, the server is further configured to transmit the pressuring value of each tire of the automobile to a mobile client of a designated user or the driver, the pressuring value of each tire of the automobile can looked through the mobile client by the designated user or the driver of the mobile client.

Further, the intelligent tire pressure monitoring system further includes an alarming module, wherein the alarming module is configured to alarm by ringing when the pressuring value of the tire of the automobile exceeds a predetermined value.

Further, the processor is configured to transmit alarming information to a mobile phone of a designated user through the $3^{rd}$ generation module.

An intelligent tire pressure monitoring system includes several steps, and the steps are described in detail as follows.

Step a, detecting rotational speed of each tire of the automobile and steering angle of steering wheel of the automobile, wherein the rotational speed of each tire of the automobile and steering angle of steering wheel of the automobile are regarded as detecting result data, and sending the detecting result data to a processor;

Step b, obtaining position information of the automobile, and sending the position information of the automobile to the processor;

Step c, calculating and processing the detecting result data and the position information of the automobile, and uploading the detecting result data and the position information of the automobile which are calculated and processed to a server through a 3rd generation module;

Step d, calculating a pressuring value of each tire of the automobile according to the detecting result data, the position information of the automobile, weather condition of continuous server days, and condition of road traveled by the automobile, and doing appropriate treatment according to the pressuring value of each tire of the automobile by the server.

Further, the step d includes the server transmitting the pressuring value of each tire of the automobile to the processor through the 3rd generation module, wherein the pressuring value of each tire is displayed by a vehicular display device to inform a driver.

Further, in the step d, the server transmitting the pressuring value of each tire of the automobile to a mobile client of a designate user or a driver, wherein the pressure value of each tire of the automobile can be looked through by the designated user or driver of the mobile client through the mobile client.

Further, the server transmits the pressuring value of each tire of the automobile to the processor through the 3$^{rd}$ generation module, and the pressuring value of each tire is displayed by a vehicular display device to inform the driver.

Further, in the step c, the rotational speed of each tire of the automobile and steering angle of steering wheel of the automobile are regarded as detecting result data.

Compared with prior art, the intelligent tire pressure monitoring system and the intelligent tire pressure method provided by the present disclosure can monitor the tire pressure quickly and easily. When the intelligent tire pressure monitoring system and the intelligent tire pressure method is used, a connector of a device which the intelligent tire pressure monitoring system and the intelligent tire pressure method is implement on is insert into a on board diagnosing (OBD) seat. The rotational speed of each tire of the automobile, the steering angle of steering wheel, and the position information of the automobile are uploaded to a server. When the pressing value of each tire of the automobile exceeds the normal range, the server alarms or reminds to the user. The intelligent tire pressure monitoring system and the intelligent tire pressure method provided by the present disclosure are low cost, safe and reliable, easy to install, and convenience in looking through the pressuring value of each tire of the automobile.

DETAILED DESCRIPTION OF ILLUSTRATED EMBODIMENTS

In order to make the purpose, the technical solution, and the advantages clearer, further description of the present invention will be illustrated, which combined with embodiments in drawings. It is understood that the embodiments of the description is only used to illustrate the present invention, and the embodiments of the description is not used to limit the present invention.

Figure 1:
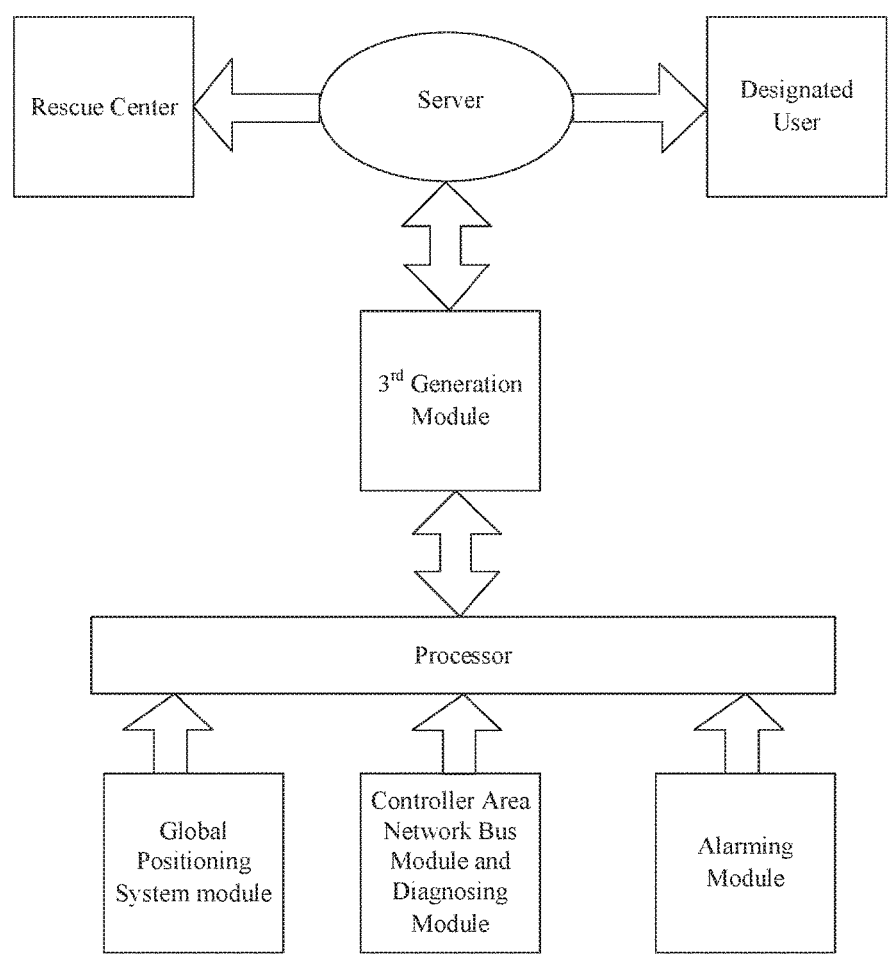
FIG. 1 is a schematic diagram of intelligent tire pressure monitoring system according to an embodiment of present disclosure.

Referring to FIG. 1, the intelligent tire pressure monitoring system includes a controller area network (CAN) bus module, a diagnosing module, a processor, a 3rd generation (3G) module, a global positioning system (GPS) module, an alarming module and a server.

The CAN bus module and the diagnosing module are configured to detect rotational speed of each tire of the automobile and steering angle of steering wheel of the automobile, and send the rotational speed of each tire of the automobile and steering angle of steering wheel of the automobile to the processor, wherein the rotational speed of each tire of the automobile and steering angle of steering wheel of the automobile are regarded as detecting result data.

The GPS module is configured to obtain position information of the automobile, and send the position information of the automobile to the processor.

In detail, the GPS module determines exact location of the automobile, speed of the automobile, and time by receiving signal provided by GPS satellite, and sends the exact location of the automobile, the speed of the automobile, and time to the processor.

The processor is configured to calculate and process the detecting result data and the position information of the automobile, and upload the detecting result data and the position information of the automobile which are calculated and processed to the server through the 3G module.

The processor is configured to run embedded operating systems and applications, control each module, calculate and process the data, and do appropriate treatment in time when detecting the detecting result date exceeds a predetermined alarming value.

The processor is connected to wireless communication network through the 3G module. The processor communicates with the server (such as vehicle monitoring center, rescue center, specific company or person), and transmits information of the tire, alarm and position information.

The server is configured to calculate a pressuring value of each tire of the automobile according to the detecting result data, the position information of the automobile, weather conditions of continuous several days, and condition of road traveled by the automobile, and do appropriate treatment according to the pressuring value of each tire of the automobile. The appropriate treatment can be alarm and reminder.

In detail, the server is configured to transmit the pressuring value of each tire of the automobile to the processor through the 3G module. The pressuring value of each tire is displayed by a vehicular display device to inform a driver.

Further, the server is further configured to transmit the pressuring value of each tire of the automobile to a mobile client of a designated user or the driver. Then the designated user or the driver of the mobile client can look through the pressuring value of each tire of the automobile through the mobile client.

The alarming module is configured to alarm by ringing when the pressuring value of the tire of the automobile exceeds a predetermined value.

In detail, the processor compares the pressuring value of each tire of the automobile with a predetermined high pressure value, a predetermined low pressure value, a predetermined high temperature value, and a predetermined low temperature value respectively. If the pressuring value of each tire of the automobile is in a normal range, another cycle of monitoring the pressuring value of each tire of the automobile begins. When at least one temperature of a tire of the automobile or at least one pressuring value of a tire of the automobile is not in the normal range, the alarming module alarms by ringing.

Further, the processor is configured to transmit alarming information to a mobile phone of a designated user through the 3G module. When at least one temperature of a tire of the automobile or at least one pressuring value of a tire of the automobile is not in the normal range, the mobile phone alarms by displaying icon on a display screen of the mobile phone and sounding continuously by a buzzer of the mobile until it is terminated by the user. When all unusual factors are removed by the user, a function of monitoring the pressuring value of each tire of the automobile begins.

Figure 2:
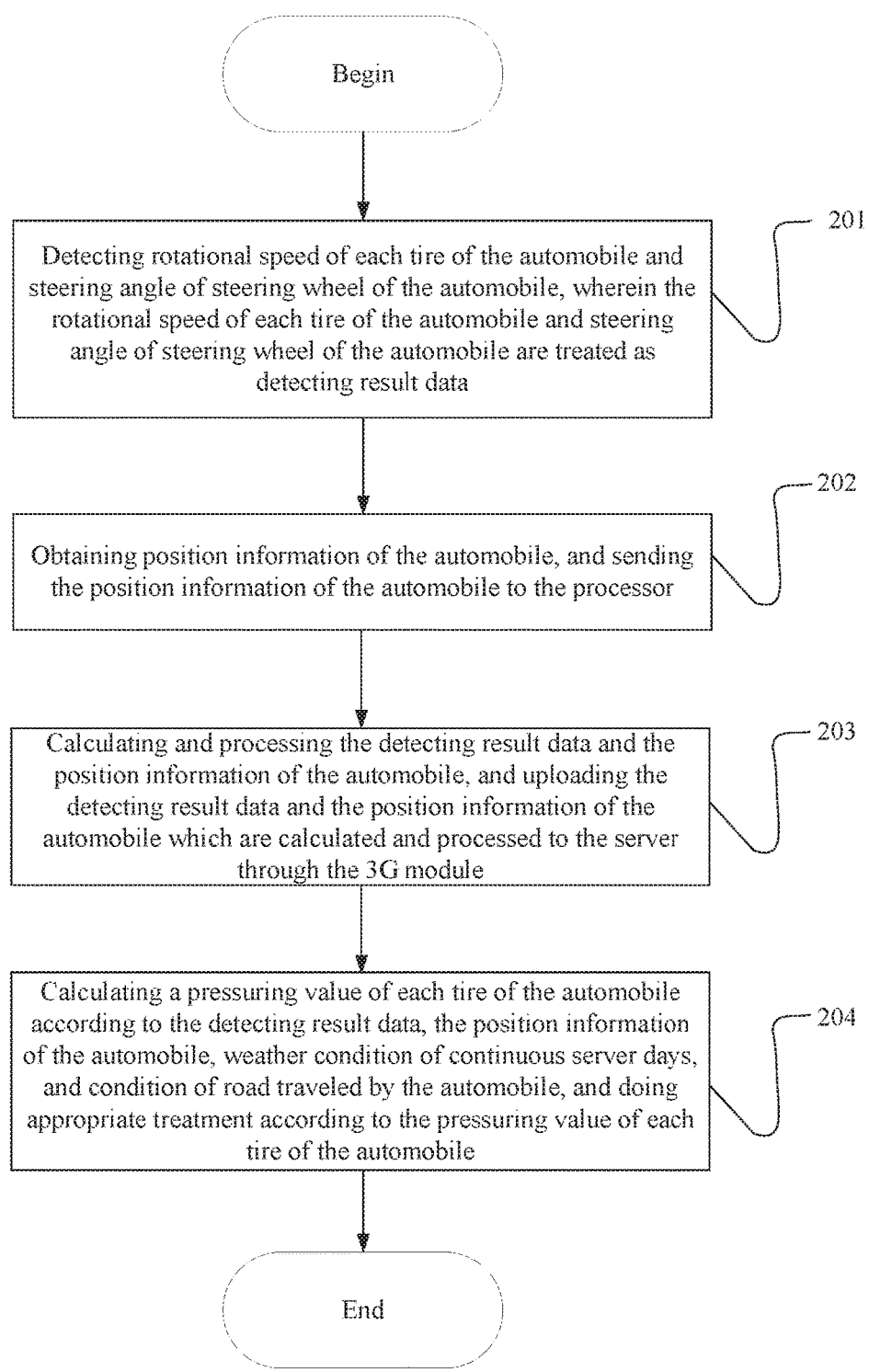
FIG. 2 is a flowchart of intelligent tire pressure monitoring method according to an embodiment of present disclosure.

Referring to FIG. 2, FIG. 2 is a flowchart of intelligent tire pressure monitoring method according to an embodiment of present disclosure. The intelligent tire pressure monitoring method according to an embodiment of present disclosure is described in detail as follows.

Step 201, detecting rotational speed of each tire of the automobile and steering angle of steering wheel of the automobile, wherein the rotational speed of each tire of the automobile and steering angle of steering wheel of the automobile are regarded as detecting result data.

Step 202, obtaining position information of the automobile, and sending the position information of the automobile to the processor.

In detail, the GPS module determines exact location of the automobile, speed of the automobile, and time by receiving signal provided by GPS satellite, and sends the exact location of the automobile, the speed of the automobile, and time to the processor.

Step 203, calculating and processing the detecting result data and the position information of the automobile, and uploading the detecting result data and the position information of the automobile which are calculated and processed to the server through the 3G module.

The processor is connected to wireless communication network through the 3G module. The processor communicates with the server (such as vehicle monitoring center, rescue center, specific company or person), and transmits information of the tire, alarm and position information.

Step 204, calculating a pressuring value of each tire of the automobile according to the detecting result data, the position information of the automobile, weather condition of continuous server days, and condition of road traveled by the automobile, and doing appropriate treatment according to the pressuring value of each tire of the automobile. The step 204 is completed by the server.

Further, the server is also configured to transmit the pressuring value of each tire of the automobile to a mobile client of a designated user or the driver. Then the designated user or the driver of the mobile client can look through the pressuring value of each tire of the automobile through the mobile client.

In detail, the server is configured to transmit the pressuring value of each tire of the automobile to the processor through the 3G module. The pressuring value of each tire is displayed by a vehicular display device to inform a driver.

The processor compares the pressuring value of each tire of the automobile with a predetermined high pressure value, a predetermined low pressure value, a predetermined high temperature value, and a predetermined low temperature value respectively. If the pressuring value of each tire of the automobile is in a normal range, another cycle of monitoring the pressuring value of each tire of the automobile begins. When at least one temperature of a tire of the automobile or at least one pressuring value of a tire of the automobile is not in the normal range, the alarming module alarms by ringing.

The intelligent tire pressure monitoring system and the intelligent tire pressure method provided by the present disclosure can monitor the tire pressure quickly and easily. When the intelligent tire pressure monitoring system and the intelligent tire pressure method is used, a connector of a device which the intelligent tire pressure monitoring system and the intelligent tire pressure method is implement on is insert into a on board diagnosing (OBD) seat. The rotational speed of each tire of the automobile, the steering angle of steering wheel, and the position information of the automobile are uploaded to a server. When the pressing value of each tire of the automobile exceeds the normal range, the server alarms or reminds to the user. The intelligent tire pressure monitoring system and the intelligent tire pressure method provided by the present disclosure are low cost, safe and reliable, easy to install, and convenience in looking through the pressuring value of each tire of the automobile.

The above descriptions are some exemplary embodiments of the invention, and should not be regarded as limitation to the scope of related claims. A person having ordinary skills in a relevant technical field will be able to make improvements and modifications within the spirit of the principle of the invention. The improvements and modifications should also be incorporated in the scope of the claims attached below.

What is claimed is:

1. An intelligent tire pressure monitoring system, comprising a controller area network bus module, a diagnosing module, a processor, a 3G module, a global positioning system module and a server; wherein, the 3G module is connected to the processor and the server;

the controller area network bus module and the diagnosing module are connected to the processor and are configured to detect rotational speed of each tire of an automobile and steering angle of an steering wheel of the automobile, and send the rotational speed of each tire of the automobile and the steering angle of the steering wheel of the automobile to the processor, wherein the rotational speed of each tire of the automobile and the steering angle of steering wheel of the automobile are regarded as detecting result data;

the global positioning system module is connected to the processor and is configured to obtain position information of the automobile, and send the position information of the automobile to the processor;

the processor is configured to calculate and process the detecting result data and the position information of the automobile, and upload the detecting result data and the position information of the automobile which have been calculated and processed to the server through the 3G module;

the server is configured to calculate a pressuring value of each tire of the automobile according to the detecting result data, the position information of the automobile, weather conditions of continuous several days, and condition of road traveled by the automobile, and take a corresponding measure according to the pressuring value of each tire of the automobile;

the server is configured to transmit the pressuring value of each tire of the automobile to the processor through the 3G module, wherein the pressuring value of each tire is displayed by a vehicular display device to inform a driver about the pressuring value of each tire;

the server is further configured to transmit the pressuring value of each tire of the automobile to a mobile client of a designated user or the driver, and pressuring value history of each tire of the automobile can be directly viewed through the mobile client by the designated user or the driver of the mobile client.

2. The intelligent tire pressure monitoring system according to claim 1, further comprising an alarming module, wherein the alarming module is configured to alarm by ringing when the pressuring value of the tire of the automobile exceeds a predetermined value; the processor is further configured to compare the pressuring value of each tire of the automobile with a predetermined high pressure value, a predetermined low pressure value, a predetermined high temperature value, and a predetermined low temperature value respectively, when the temperature of at least one tire of the automobile or the pressuring value of at least one tire of the automobile is not in the normal range, the alarming module alarms by ringing.

3. The intelligent tire pressure monitoring system according to claim 1, wherein the processor is configured to transmit alarming information to a mobile phone of a designated user through the 3G module.

4. An intelligent tire pressure monitoring method, comprising:

step a, detecting rotational speed of each tire of an automobile and steering angle of a steering wheel of the automobile, wherein the rotational speed of each tire of the automobile and the steering angle of the steering wheel of the automobile are regarded as detecting result data, and sending the detecting result data to a processor;

step b, obtaining position information of the automobile, and sending the position information of the automobile to the processor;

step c, calculating and processing the detecting result data and the position information of the automobile, and uploading the detecting result data and the position information of the automobile which have been calculated and processed to a server through a 3G module;

step d, calculating a pressuring value of each tire of the automobile according to the detecting result data, the position information of the automobile, weather condition of continuous server days, and condition of road traveled by the automobile, and taking a corresponding measure according to the pressuring value of each tire of the automobile by the server, wherein, the step d comprises:

the server transmitting the pressuring value of each tire of the automobile to the processor through the 3G module, wherein the pressuring value of each tire is displayed by a vehicular display device to inform a driver about the pressuring value of each tire;

the server transmitting the pressuring value of each tire of the automobile to a mobile client of a designate user or a driver, wherein pressure value history of each tire of the automobile can be directly viewed by the designated user or the driver of the mobile client through the mobile client.

5. The intelligent tire pressure monitoring method according to claim 4, wherein the server transmits the pressuring value of each tire of the automobile to the processor through the 3G module, and the pressuring value of each tire is displayed by a vehicular display device to inform the driver.

6. The intelligent tire pressure monitoring method according to claim 4, wherein in the step c, the rotational speed of each tire of the automobile and the steering angle of the steering wheel of the automobile are regarded as the detecting result data.

7. The intelligent tire pressure monitoring method according to claim 4, further comprising: alarming by ringing when the pressuring value of the tire of the automobile exceeds a predetermined value by an alarming module.

8. The intelligent tire pressure monitoring method according to claim 7, wherein, the step of alarming by ringing when the pressuring value of the tire of the automobile exceeds a predetermined value by an alarming module, comprises:

comparing the pressuring value of each tire of the automobile with a predetermined high pressure value, a predetermined low pressure value, a predetermined high temperature value, and a predetermined low temperature value respectively; and alarming by the ringing by the alarming module when the temperature of at least one tire of the automobile or the pressuring value of at least one tire of the automobile is not in the normal range.

* * * * *